United States Patent
Albiez (10) Patent No.: US 11,618,982 B2
(45) Date of Patent: Apr. 4, 2023

(54) OPW AIRBAG

(71) Applicant: Global Safety Textiles GmbH, Bad Säckingen (DE)

(72) Inventor: Daniel Albiez, Murg (DE)

(73) Assignee: GLOBAL SAFETY TEXTILES GMBH, Maulburg (DE)

( * ) Notice: Subject to any disclaimer, the term of this patent is extended or adjusted under 35 U.S.C. 154(b) by 107 days.

(21) Appl. No.: 17/208,539

(22) Filed: Mar. 22, 2021

(65) Prior Publication Data
US 2021/0301430 A1    Sep. 30, 2021

(30) Foreign Application Priority Data

Mar. 26, 2020   (DE) ............... 10 2020 108 396.3

(51) Int. Cl.
*B60R 21/16* (2006.01)
*D03D 11/00* (2006.01)
(Continued)

(52) U.S. Cl.
CPC ......... *D03D 13/004* (2013.01); *B60R 21/235* (2013.01); *D03D 1/02* (2013.01);
(Continued)

(58) Field of Classification Search
CPC ........ D03D 13/004; D03D 1/02; D03D 11/00; D03D 11/02; B60R 21/235;
(Continued)

(56) References Cited

U.S. PATENT DOCUMENTS 6,007,092 A * 12/1999 Martz ............... D03D 1/0005
                                                    280/743.1
6,296,276 B1 * 10/2001 Ritter ................ B60R 21/2338
                                                    280/743.2
(Continued)

FOREIGN PATENT DOCUMENTS

DE        20015134 U1      1/2001
DE    102019002441 A1     10/2020
(Continued)

OTHER PUBLICATIONS

Euro NCAP: Far side occupant test & assessment procedure. Version 1.0. Leuven, Belgien, 2017. 22 S. URL: https://cdn.euroncap.com/media/32284/euro-cap-far-side-test-and-assessment-protocol-v1 O.pdf (abgerufen am Jul. 24, 2019).

*Primary Examiner* — Robert H Muromoto, Jr.
(74) *Attorney, Agent, or Firm* — Pearne & Gordon LLP (57) ABSTRACT

An OPW airbag having warp and weft threads woven together in at least three woven fabric layers: a lower fabric layer, an upper fabric layer, and a middle fabric layer therebetween. The weft threads of the middle fabric layer emerge from the middle fabric layer in a first partial region of the airbag and are tied partially to the upper fabric layer and partially to the lower fabric layer. The warp threads of the middle fabric layer emerge from the middle fabric layer in the first partial region of the airbag and float freely between the lower fabric layer and the upper fabric layer. The weft and warp threads of the middle fabric layer are incorporated into the lower fabric layer or into the upper fabric layer in a second partial region of the airbag or are tied to the lower or upper fabric layer at a few attachment points.

9 Claims, 7 Drawing Sheets (51) Int. Cl.
  *D03D 13/00* (2006.01)
  *B60R 21/235* (2006.01)
  *D03D 1/02* (2006.01)

(52) U.S. Cl.
  CPC .... *D03D 11/00* (2013.01); *B60R 2021/23514* (2013.01); *B60R 2021/23547* (2013.01); *D10B 2505/124* (2013.01)

(58) Field of Classification Search
  CPC ........ B60R 2021/23547; B60R 21/231; B60R 21/23138; B60R 21/233; B60R 2021/23316; B60R 2021/23509; D10B 2505/124
  See application file for complete search history.

(56) References Cited

U.S. PATENT DOCUMENTS

| | | | | |
|---|---|---|---|---|
| 6,398,253 B1* | 6/2002 | Heigl | ................ | B60R 21/232 280/730.2 |
| 6,641,165 B2* | 11/2003 | Ohhashi | ................ | D04B 21/20 280/743.1 |
| 6,705,244 B1* | 3/2004 | Berger | ................ | D03D 1/0005 139/389 |
| 7,780,194 B2* | 8/2010 | Trondle | ................ | B60R 21/235 442/76 |
| 8,763,649 B2* | 7/2014 | Becker | ................ | D03D 3/00 442/76 |
| 11,007,969 B2* | 5/2021 | Albiez | ................ | D03D 11/02 |
| 2004/0070180 A1* | 4/2004 | Johansson | ............ | B60R 21/235 280/728.1 |
| 2007/0200329 A1* | 8/2007 | Ma | ................ | B60R 21/231 280/743.1 |
| 2010/0181744 A1* | 7/2010 | Crouch | ................ | B60R 21/235 156/499 |
| 2012/0018065 A1* | 1/2012 | Ruschulte | ................ | B60C 27/18 428/156 |
| 2012/0058699 A1* | 3/2012 | Huber | ................ | D03D 3/02 442/189 |
| 2014/0030455 A1* | 1/2014 | Ruschulte | ................ | B25J 9/1075 139/11 |
| 2015/0367807 A1* | 12/2015 | Becker | ................ | B60R 21/23 280/743.1 |
| 2020/0101929 A1* | 4/2020 | Albiez | ................ | B60R 21/235 |
| 2021/0300291 A1* | 9/2021 | Albiez | ................ | D03D 11/02 |
| 2022/0097642 A1* | 3/2022 | Albiez | ................ | B32B 7/05 |

FOREIGN PATENT DOCUMENTS

| | | |
|---|---|---|
| EP | 3127758 A1 | 2/2017 |
| WO | 2020201018 A1 | 10/2020 |

* cited by examiner

OPW AIRBAG

The present invention relates to a one-piece woven (OPW) airbag having at least three woven fabric layers, a lower fabric layer, an upper fabric layer and a middle fabric layer arranged therebetween.

So-called far-side airbags, also known as front-center airbags, are arranged, for example, in the driver's seat of motor vehicles on the side directed towards the front passenger. These airbags are to be used in the future to meet the new Euro NCAP test requirements expected to come into force in 2020. Test descriptions for this can be found on the Internet, for example, under "euro-ncap-far-side-test-and-assessment-protocol-v10.pdf". See also "European New Car Assessment Programme" at www.euroncap.com.

Previously, it has only been possible to produce the airbags referred to above using the very complex cut, seal & sew process. A large number of woven fabric pieces are cut from one fabric length or a plurality of fabric lengths, coated with a sealing compound and sewn together to form airbags in an expensive and time-consuming process. So as to ensure the best possible protection for the vehicle occupants, such an airbag must have a distinct shape and very high stiffness when inflated. Known airbags for this purpose represent complex solutions and are currently produced with a high level of making-up effort, for example by cutting out two or more identical or partially identical or different production parts from a flat silicone-coated woven fabric, spraying on a sealing compound, e.g. in the form of a peripheral bead, at the edge and then placing the two or more fabric parts on top of each other, as well as then adhesively bonding the parts together. In addition, the fabric layers are sewn to ensure sufficient strength of the adhesive seam. Further components, e.g. rebound straps, straps, etc. have to be sewn on in a further process step for shaping (with or without sealing compound). The process is very time- and cost-intensive and requires a large number of manual process steps. However, the installation space available for the complete module in the vehicle seat is very limited. Sewn far-side airbags require more space as the seams and several layers of fabric make them very bulky.

EP 3 127 758 A1 discloses a far-side airbag apparatus which has a two-layer airbag that is sewn multiple times, in whose interior various pieces of specifically dimensioned and positioned material are sewn parallel to the outer layers of the otherwise two-layer airbag for controlling the spatial structure desired during inflation. In addition, specific connecting seams are created to connect the two outer fabric layers. The patent description details the laborious and time-consuming production of far-side airbags.

The German utility model specification DE 200 15 134 U1 describes a head-side airbag protection device having an airbag with two fabric layers which are joined together by spacers, the spacers limiting the distance between the fabric layers in the inflated state. The spacers consist of warp and weft threads which in each case emerge locally in predetermined regions from one of the two fabric layers and, after interweaving in so-called regions 61 with warp and weft threads extending from the other opposing fabric layer, go back into their original fabric layer or into the opposing fabric layer. The protection device described here is characterized by the spacers described but leaves a lot to be desired in terms of stiffness in the inflated state.

It is thus an object of the invention to propose an airbag which now avoids or at least greatly diminishes the known disadvantages in prior art.

The object is achieved with an OPW airbag according to claim 1, namely an OPW airbag having warp threads and weft threads, which are woven together in at least three woven fabric layers, a lower fabric layer, an upper fabric layer and a middle fabric layer arranged therebetween, wherein
a) the weft threads of the middle fabric layer emerge from said middle fabric layer in a first partial region of the OPW airbag and are partially tied to the upper fabric layer and partially to the lower fabric layer and wherein
b) the warp threads of the middle fabric layer emerge from said middle fabric layer in the first partial region of the OPW airbag and float freely between the lower fabric layer and the upper fabric layer and wherein
c1) the weft threads and the warp threads of the middle fabric layer are incorporated into the lower fabric layer or into the upper fabric layer in a second partial region of the OPW airbag
or
c2) are tied to the lower fabric layer or to the upper fabric layer at a few attachment points.

Advantageously, the warp threads and weft threads of the middle fabric layer are not woven together in a first partial region and consequently do not form a closed fabric surface. Due to the fact that the weft threads in the first partial region do not float, as they are incorporated into the lower fabric layer or into the upper fabric layer or are tacked to the lower fabric layer or to the upper fabric layer at a few attachment points, advantageously they cannot be pushed up to form thick spots or bulges during further processing steps (e.g. winding, laminating, coating).

In the inflow region, which forms the transition from the two-layer to the three-layer region, according to the embodiment according to the invention, the weft threads of the middle fabric layer are each advantageously tied, for example, in equal shares to the upper fabric layer and to the lower fabric layer. In fact, this could also be carried out in unequal shares. After emerging from the middle fabric layer, the warp threads of the middle fabric layer float in the entire inflow region until they are incorporated in or tied to the upper fabric layer or lower fabric layer in a second partial region adjacent to the inflow region. Tying of the weft threads of the middle fabric layer to the outer layers in the second partial region is advantageously possible in that the inflow region is preferably arranged parallel to the warp or weft threads.

On inflating a three-layer or multi-layer airbag which has been woven in the area of the inflow region using the design described above, the filling medium (inflation gas) flows out of the two-layer generator mouth region into the three-layer airbag region against a lower resistance, as the weft threads of the middle fabric layer are tied to the upper fabric layer or lower fabric layer and as a result, they do not offer any "mechanical" resistance to the filling medium.

A further advantage of the invention emerges in that during the production process the loose weft threads of the middle fabric layer are prevented from pushing up to form a bulge. With an embodiment not according to the invention, this occurs mainly during the washing and drying process and then leads to wrinkling during winding and the subsequent processes and, as a result, to production difficulties, particularly during lamination and coating, and increased waste. This problem is solved by virtue of the present invention.

Advantageously, the OPW airbag according to the invention is a One-Piece Woven (OPW) airbag, woven in one piece in a single work operation, which advantageously, coming ready-woven straight from the loom, is already equipped and configured with all its functional features. To comply with the different leak tightness requirements specified, it then only has to be provided individually in each case with a sealing agent. In contrast to airbags known from the prior art, the result is a major saving in cost and production time. The configuration according to the invention of the completely floating warp and weft threads of the middle fabric layer in the first partial region of the OPW airbag also allows the chamber arranged between the lower fabric layer and the middle fabric layer and the chamber arranged between the upper fabric layer and the middle fabric layer to communicate. These two chambers are created during weaving due to the weave design according to the invention, namely that a portion of the warp threads of the upper fabric layer and a portion of the warp threads of the lower fabric layer are arranged in such a manner that they each leave these fabric layers in a selected region and enter the middle fabric layer in second partial regions. In one inflation process, the two chambers can be filled simultaneously by a generator or inflator and already form a stable far-side airbag. The aim is to meet the requirements of the Euro-NCAP with this basic design.

In an advantageous embodiment of the invention, the OPW airbag is characterized in that the weft threads and the warp threads of the middle fabric layer are incorporated in the second partial region of the OPW airbag except for at the attachment points in an inner lower fabric layer parallel to the lower fabric layer or in an inner upper fabric layer parallel to the upper fabric layer.

This embodiment has the advantage that the weft and warp threads of the middle fabric layer are not firmly incorporated into the upper or lower fabric layer and rather form two distinct additional inner fabric layers woven, for example, in plain weave. The thread density of the two inner fabric layers then corresponds per fabric layer, for example approximately, half the thread density of the middle fabric layer present in the remaining airbag. In a preferred embodiment, four fabric layers are formed in this region. The two inner fabric layers, top and bottom, are then preferably tied to the associated lower fabric layer or upper fabric layer respectively with a few connections (attachment point).

In a further advantageous embodiment of the invention, the OPW airbag is characterized in that the upper fabric layer and the middle fabric layer are joined together in selected regions via X-tethers. This configuration according to the invention enables accurate control of the individually desirable shape of the upper chamber. In the selected regions, in which two fabric layers are joined together via X-tethers, local expansion of the airbag and the extent thereof during inflation are intentionally restricted according to the invention.

In a further advantageous embodiment of the invention, the OPW airbag is characterized in that the lower fabric layer and the middle fabric layer are joined together in selected regions via X-tethers. This configuration according to the invention enables accurate control of the individually desirable shape of the lower chamber or both chambers. It also applies here that in the selected regions, in which two fabric layers are joined together via X-tethers, local expansion of the airbag and the extent thereof during inflation can be advantageously and intentionally restricted according to the invention.

In yet another advantageous embodiment of the invention, the OPW airbag is characterized in that it comprises a front portion, a middle portion and a rear portion, where in the front portion a generator mouth for receiving a generator and adjacent thereto in a first partial region an inflow region are arranged, stiffening chambers extending longitudinally in the direction of the rear portion being arranged between the middle fabric layer and the lower fabric layer in the middle portion, and stiffening chambers extending transversely thereto being arranged in the rear portion. By means of the longitudinally or transversely extending stiffening chambers provided according to the invention, it is possible to form "harder" and less "hard" parts of the OPW airbag according to the invention in a targeted manner and thus to adjust the longitudinal and/or transverse stiffness, it being possible to arrange the stiffening chambers in the OPW airbag independently of direction.

In yet another advantageous embodiment of the invention, the OPW airbag is characterized in that X-tether series are arranged between the middle fabric layer and the upper fabric layer, adjacent and parallel to the stiffening chambers, extending transversely between the middle fabric layer and the lower fabric layer, the width of said columns being less than the width of the stiffening chambers extending transversely. According to the invention, this configuration then allows a controlled curvature of one part of the airbag in relation to another. Advantageously, here the rear portion can be lifted out of the fabric plane "into the third dimension" in relation to the front and middle portion, in that the different widths of the X-tether series and stiffening chambers, when the airbag is inflated, result in a curvature of the rear portion in the direction of the side on which the X-tether series are located. This is caused because the X-tether series, the width of which is less than the width of the transversely extending stiffening chambers, draw together the outer upper fabric layer more than the stiffening chambers do on the opposite side.

In yet another advantageous embodiment of the invention, the OPW airbag is characterized in that it comprises at least one single-layer region, extending transversely, in the region between the middle portion and the rear portion. Linear single-layer regions in OPW airbags are always suitable for bending the airbag slightly along these regions. In this advantageous development of the invention, this enables bending.

In yet another advantageous embodiment of the invention, the OPW airbag is characterized in that it comprises lateral recesses in the region between the middle portion and the rear portion. Such recesses are also suitable for facilitating bending of the airbag in this region. In the event of deployment, i.e. in a collision, the airbag according to the invention is inflated abruptly. In this case, it is in contact with the vehicle occupant in the thoracic region. According to the invention, its so-called rear portion can flex along the bending line and, due to the above-mentioned curvature "in the third dimension", it is in contact with the head of the vehicle occupant.

Finally, in yet another advantageous embodiment of the invention, the OPW airbag is characterized in that it is provided with a polymer layer on its outer surfaces. Coating with a sealing compound such as this advantageously increases the impermeability to air of the fabric layers and in turn the dimensional stability of the airbag under inflation pressure.

In particular, the object of the present invention can be used in the far-side bag sector, since such a bag is required in the Euro NCAP 2020 guideline.

To facilitate better understanding of the invention, it will now be briefly described by way of an example embodiment with the aid of a drawing, in which: the figures show mainly schematic plan views or sectional views.

Figure 1:
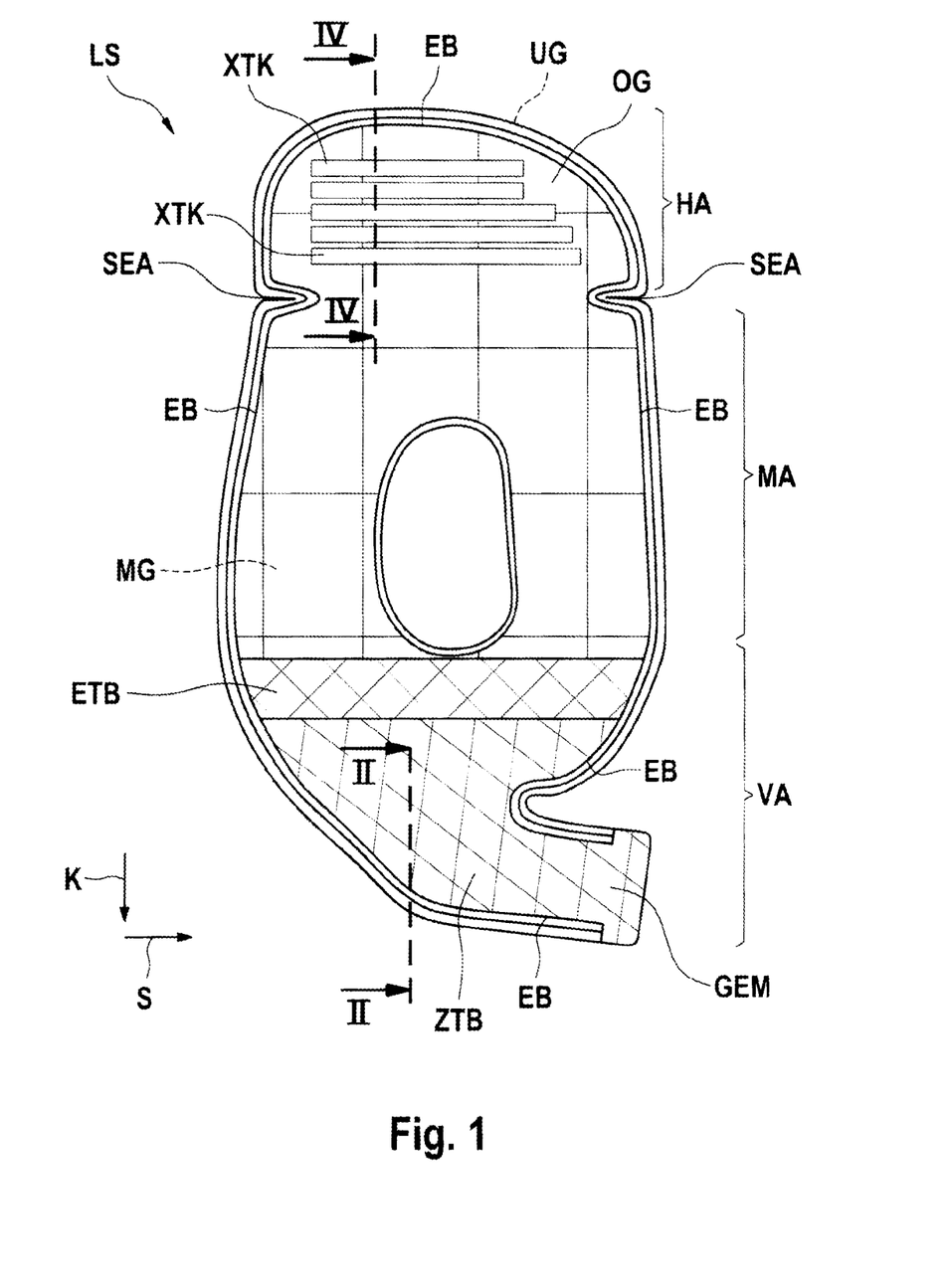
FIG. 1 is a greatly simplified diagrammatic view from above of an OPW airbag in the uninflated state.

FIG. 1 shows a greatly simplified view from above of an embodiment of an OPW airbag LS in the uninflated state. The OPW airbag LS is woven in one piece from warp and weft threads. The warp threads run in the warp direction according to arrow K. The weft threads run in the weft direction according to arrow S. However, the direction is not binding. They form three woven fabric layers, a lower fabric layer UG, an upper fabric layer OG and a middle fabric layer MG arranged therebetween.

The OPW airbag LS is divided into a front portion VA, a middle portion MA and a rear portion HA. The upper fabric layer OG is directed towards the viewer. The lower fabric layer UG is directed away from the viewer. The middle fabric layer MG (indicated here by a large checked pattern) cannot be seen in this illustration as it is located inside the OPW airbag LS. It extends from the rear portion HA across the middle portion MA into the front portion VA. In the front portion VA, there is a first partial region ETB (small diamond check pattern for illustration purposes only), in which the warp and weft threads of the middle fabric layer MG emerge therefrom. The warp threads float between the lower fabric layer UG and the upper fabric layer OG. The weft threads of the middle fabric layer are partially tied to the upper fabric layer OG and partially to the lower fabric layer UG in the first partial region ETB. The person skilled in the art understands "tied" to mean binding into a layer (here lower fabric layer UG or upper fabric layer OG) as looping over one or a few threads of the layer. Adjoining the small diamond checked first partial region ETB of the front portion VA of the OPW airbag LS, there is a second partial region ZTB (larger diamond check pattern for illustration purposes only). The warp threads previously floating in the first partial region ETB and the tied weft threads as described above of the middle fabric layer MG enter the upper fabric layer OG or the lower fabric layer UG at the transition from the first partial region ETB to the second partial region ZTB which is configured in two layers. The second partial region ZTB is configured in two layers, i.e. it consists of only upper fabric layer OG and lower fabric layer UG. The generator mouth GEM, in the region of which a generator G (not shown) is connected, is also located here.

A single-layer region EB surrounds the OPW airbag LS as a "woven seam". The so-called woven seam results due to the fact that all warp and weft threads are brought together in this region in one fabric layer. A section line II-II is marked in the front portion VA. This is dealt with in the description of FIG. 2.

A section line IV-IV is marked in the rear portion HA. This is dealt with further in the description of FIGS. 4c and 4d. However, reference should be made to the X-tether series XTK indicated by oblong rectangles running transversely which are arranged between the upper fabric layer OG and the middle fabric layer MG and cannot actually be seen in the current FIG. 1.

Figure 2:
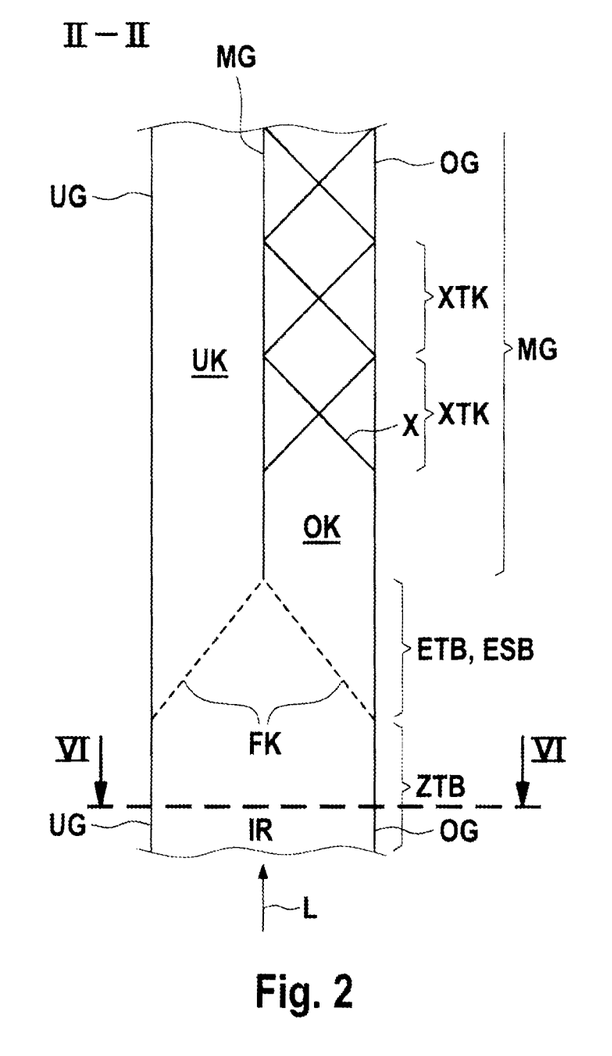
FIG. 2 is a highly simplified sectional view from FIG. 1 in the uninflated state, where completely floating warp threads of the middle fabric layer are illustrated in a first partial region of the OPW airbag.

FIG. 2 shows a schematic sectional view II-II from FIG. 1 in the inflated state from above, where free floating warp threads FK of the middle fabric layer MG are shown in the first partial region ETB of the OPW airbag LS. It should be noted that the three fabric layers lie close together in the uninflated state, the floating warp threads FK lying loosely between the two outer layers OG and UG.

In FIG. 2, one can see a three-layer fabric (in the drawing) coming from above, consisting of the lower fabric layer UG, the upper fabric layer OG and the middle layer MG arranged therebetween. An upper chamber OK is located between the upper fabric layer OG and the middle fabric layer MG. A lower chamber UK is located between the middle fabric layer MG and the lower fabric layer UG. The middle fabric layer MG arranged therebetween ends at the first partial region ETB and disintegrates there, as it were, in that the warp and weft threads of the middle fabric layer MG are not woven together in the first partial region ETB, they emerge from the middle fabric layer MG. The warp threads float between the lower fabric layer UG and the upper fabric layer OG, and enter the lower fabric layer UG or the upper fabric layer OG at the transition into the second partial region ZTB where they are then incorporated. A special feature of the configuration according to the invention is that the middle fabric layer MG no longer exists in the first partial region ETB and in the second partial region ZTB.

A few tether series XTK, consisting of so-called X-tethers, which in turn are formed by a mutual exchange of warp and/or weft threads into the adjoining woven layer, are indicated by way of example in the upper chamber OK. A tether series consists of a plurality of X-tethers arranged side by side in a series. The object and purpose of the X-tethers is to limit or control the swelling of the respective fabric layers during inflation. This is known to a person skilled in the art.

In the deployment case of the OPW airbag LS according to the invention, starting from the generator mouth GEM, the medium used to inflate the airbag—referred to in the following only as "inflation air" or "air"—flows out of the two-layer second partial region ZTB through the first partial region ETB, also referred to as the inflow region ESB, in which warp and weft threads float, in the direction of the middle fabric layer MG which begins after the first partial region ETB.

This inflow region ESB, which is intended to enable the air to flow in with as little resistance as possible, is required to achieve dynamic filling of the airbag LS or the two air chambers OK and UK located one above the other, respectively, without damaging them. The inflow region ESB is designed in such a way that the warp threads of the middle fabric layer MG float freely. There is therefore no interweaving of the threads in this area. In the inflow region ESB the warp threads are so to speak "loose" inside the airbag LS.

In the two-layer second partial region ZTB, in which the generator is also connected, the warp and weft threads of the middle fabric plane MG are then also incorporated into the lower fabric layer UG or into the upper fabric layer OG or are tacked on the inside to the upper fabric layer OG and lower fabric layer UG optionally in equal or different proportions. The inflow region ESB forms the connecting portion so to speak between the two-layer generator mouth GEM and the chambers OK and UK of the airbag LS.

Figure 3:
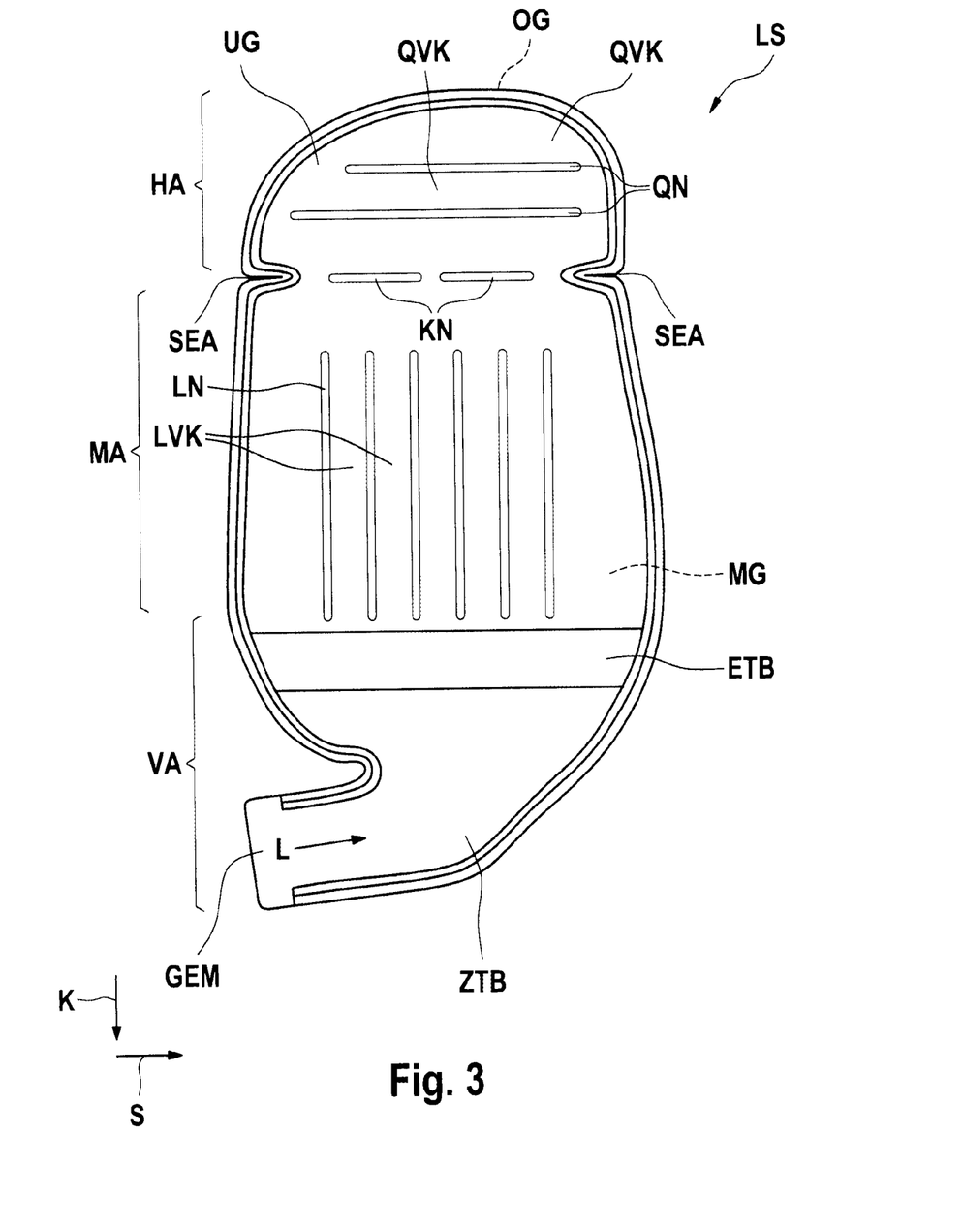
FIG. 3 shows a greatly simplified diagrammatic view from below of the OPW airbag from FIG. 1 in the uninflated state.

FIG. 3 shows the OPW airbag LS according to the invention from the underside. The lower fabric layer UG is thus directed towards the observer. The upper fabric layer OG is directed away from the observer. The position of the first partial region ETB can be seen. This illustration is used initially to describe stiffening chambers QVK and LVK. Stiffening chambers LVK, extending longitudinally in the direction of the rear portion HA, are arranged in the middle portion MA. They lie between seams LN which are applied as woven seams between the middle fabric layer MG and the lower fabric layer UG. Stiffening chambers QVK, extending transversely thereto, are arranged in the rear portion HA. These lie between seams QN which are also applied as woven seams between the middle fabric layer MG and the lower fabric layer UG. Both types of chambers are used to stiffen the OPW airbag LS in the longitudinal or transverse direction in the event of inflation.

Arranged between the rear portion HA and the middle portion MA are woven folding seams KN which join the middle fabric plane MG and the upper fabric plane OG together. Lateral recesses SEA arranged on the outer edge of the OPW airbag LS support the rear portion HA enabling it to bend or fold relative to the middle portion MA. The folding seams KN act like articulated joints.

Figure 4A:
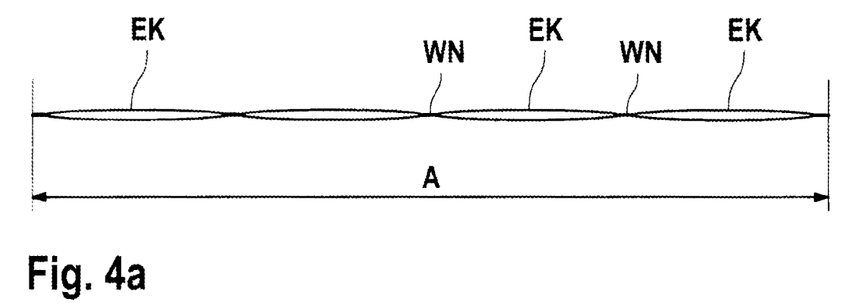
FIG. 4a shows a greatly simplified diagrammatic and exemplary sectional view of a portion of an OPW airbag with individual chambers in the uninflated state. To illustrate the actual position of the fabric layers in relation to each other, they are shown pulled slightly apart.
Figure 4B:
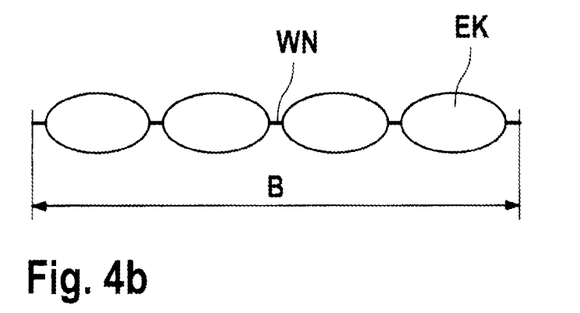
FIG. 4b shows a greatly simplified diagrammatic sectional view of the portion of the OPW airbag according to FIG. 4a, but in the inflated state and correspondingly shorter.

FIG. 4a shows a simple two-layer OPW airbag with individual chambers EK and woven seams WN in the uninflated state to demonstrate the geometry when OPW airbags are inflated. It has the length A. When inflated, see FIG. 4b, it shortens to the length B. By filling the chambers EK with air, they swell. The airbag goes "into the third dimension" and becomes shorter.

Figure 4C:
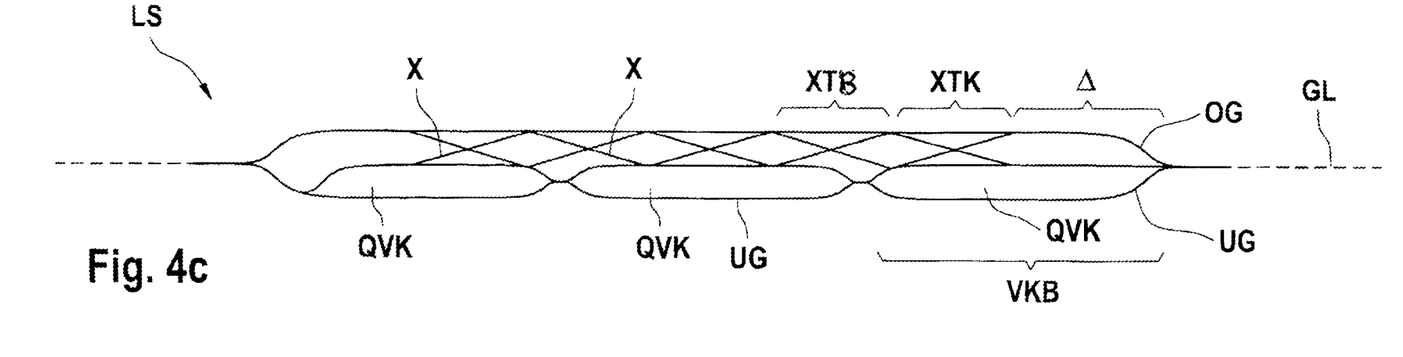
FIG. 4c shows a greatly simplified diagrammatic sectional view of a rear portion of an OPW airbag with X-tethers and stiffening chambers in the uninflated state. To illustrate the actual position of the fabric layers in relation to each other, they are shown pulled slightly apart.

By way of example and highly schematically, FIG. 4c shows a detail of the airbag LS according to the invention which deviates from realistic dimensions for better understanding and is formed in three layers in the rear portion HA, in a sectional view IV-IV from FIG. 1 in the uninflated state, but pulled slightly apart upwards and downwards for illustration purposes and oriented on a baseline GL. X-tether series XTK, which are formed from X-tethers and have the width XTB, are arranged between the upper fabric layer OG and the middle fabric layer MG. Transverse stiffening chambers QVK with a width VKB are arranged between the middle fabric layer MG and the lower fabric layer UG. The width XTB of the X-tether series XTK is shorter than the width XTB of the transverse stiffening chambers QVK by Δ selectable with the width determination.

Figure 4D:
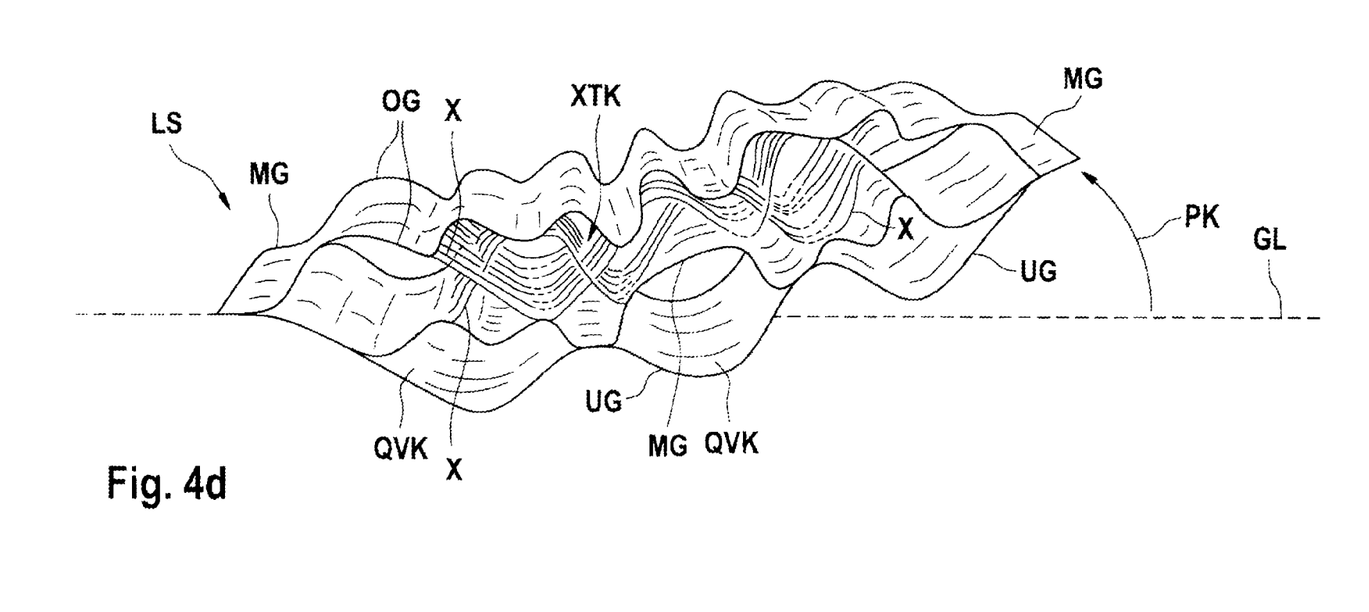
FIG. 4d shows a greatly simplified sectional view of the rear portion of the OPW airbag according to FIG. 4c with X-tethers and stiffening chambers similar to FIG. 4c, but in the inflated state with curved rear portion.

FIG. 4d now illustrates the consequence of inflating the OPW airbag LS shown here, namely that the airbag bends in the direction of the arrow PK due to the Δ. The transverse stiffening chambers QVK shorten less than the X-tether columns XTK. As shown on the right-hand side of FIG. 4d, this results in it curving upwards. The OPW airbag LS according to the invention becomes somewhat shorter. Its right-hand end moves—controlled in a targeted manner by the arrangement and number of X-tethers—from the baseline GL upwards.

It is also easy to see in FIGS. 4c and 4d how the X-tethers X emerge from the upper fabric layer OG and enter the middle fabric layer MG and vice versa. The X-tether series XTK and the x-shaped crossing of the X-tethers are also shown schematically. Of course, the number of X-tethers may vary. Only a few are shown here by way of example.

Figure 5:
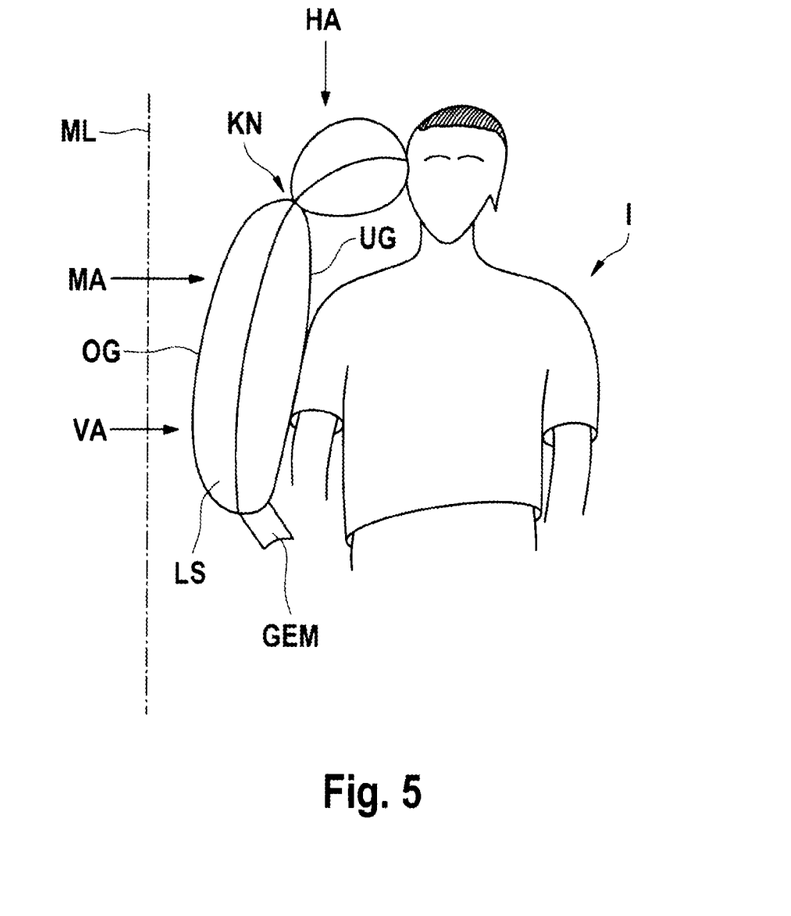
FIG. 5 shows a greatly simplified diagrammatic view of the OPW airbag in the inflated state from the side, in contact with a vehicle occupant.

FIG. 5 shows the OPW airbag according to the invention in the deployment case, that is in the inflation situation. The OPW airbag LS is shown, for example, arranged with its front region VB in the pelvic area of a vehicle occupant I and inflated.

With its front portion VA and its middle portion MA, it is in contact with the arm and chest region thus protecting the occupant I. It is also easy to see that the rear portion of the OPW airbag LS is bent in the region of the folding seam KN and is inclined towards the head of the occupant, protecting it by pushing it away from an implied center line ML of an imaginary vehicle.

Figure 6:
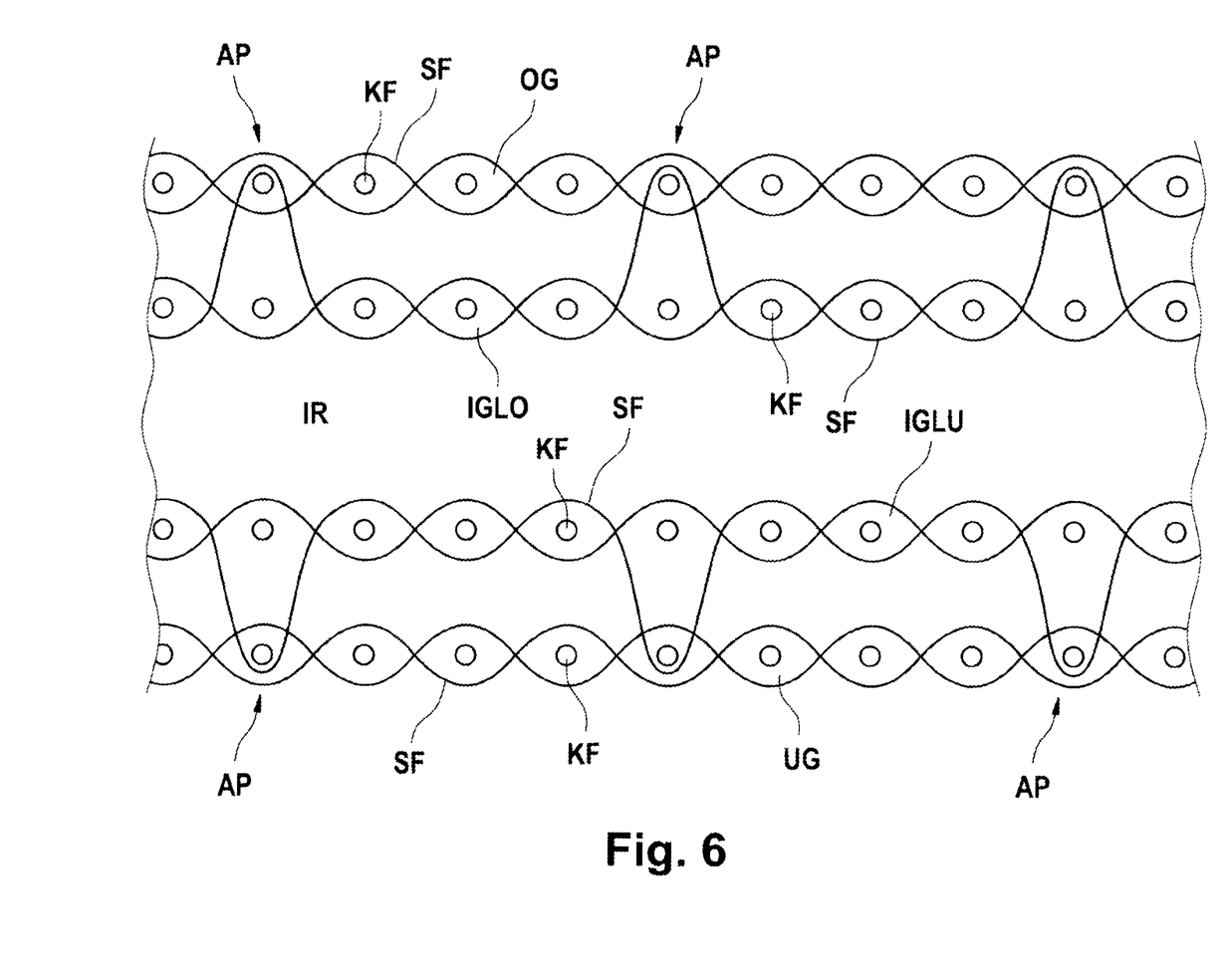
FIG. 6 shows a greatly simplified diagrammatic detail of a lower fabric layer UG and an upper fabric layer OG of an embodiment of a second partial region of the OPW airbag according to the invention.

FIG. 6 shows a detail of a lower fabric layer UG and an upper fabric layer OG of a second partial region of an OPW airbag. For the sake of simplicity, the lower fabric layer UG and the upper fabric layer OG are shown as plain weave L 1/1. Cross-sections of warp threads KF shown as small circles are "looped around" by SF shown as lines (Of course, warp threads KF and weft threads SF could be interchanged here!). In FIG. 6 top, the upper fabric layer OG can be seen which, together with the lower fabric layer UG shown in FIG. 6 bottom, encloses the inner upper and lower fabric layers IGLO and IGLU, with which they in turn enclose an interior IR of the second partial region ZTB.

The weft and/or warp threads of the inner upper and lower fabric layers IGLO and IGLU leave "their" fabric layer IGLO and IGLU at selected locations and enter the upper and lower fabric layer OG and UG, loop around a warp thread there at attachment point AP and then return to "their" fabric layer IGLO and IGLU. Thus, by way of example, the inner upper and lower fabric layers IGLO and IGLU are tied to the "outer" upper fabric layer OG and lower fabric layer UG.

A very special advantage of this embodiment according to the invention is that the thread masses of the three fabric layers woven in the rear portion HA and in the middle portion MA, i.e. the lower fabric layer UG, the upper fabric layer OG and the middle fabric layer MG arranged therebetween in the second partial region ZTB of the OPW airbag, in which the generator mouth GEM is also located, are divided between four fabric layers OG, IGLO, IGLU, UG and thus a so-called recoiling fell is prevented, since the weft threads SF and warp threads KF of the middle fabric layer MG are not (firmly) incorporated into the OG or UG but rather form two separate e.g. plain weave layers. The thread density of the two inner fabric layers corresponds per layer to half the thread density of the middle fabric layer MG present in the remaining airbag. Thus, four fabric layers are formed in this region. The two inner fabric layers top IGLO and bottom IGLU are tied to the associated lower fabric layer UG or upper fabric layer OG respectively with a few connections at attachment points AP.

LIST OF REFERENCE NUMERALS

AP Attachment point
EB Single-layer region

EK Single chamber
ESB Inflow region
ETB First partial region
FK Floating warp threads
G Generator
GEM Generator mouth
GL Baseline
HA Rear portion
I Occupant
IGLO Inner upper fabric layer
IGLU Inner lower fabric layer
IR Interior of the second partial region ZTB
K Warp direction (arrow)
KF Warp thread
KN Folding seam
KOG Warp thread of the upper fabric layer
KMG Warp thread of the middle fabric layer
KUG Warp thread of the lower fabric layer
L Air flow arrow
LN Longitudinal seam
LS OPW airbag
LVK Stiffening chamber
MA Middle portion
MG Middle fabric layer
ML Center line
OG Upper fabric layer
PK Curvature arrow
QN Transverse seam
QVK Stiffening chamber
S Weft direction (arrow)
SEA Lateral recess
SF Weft thread
SMG Weft thread
UG Lower fabric layer
VA Front portion
WN Woven seam
X X-tether
XTK Tether column
ZL Two-layer region
ZTB Second partial region

The invention claimed is:

1. A one-piece woven (OPW) airbag having warp threads and weft threads, which are woven together in at least three woven fabric layers, a lower fabric layer, an upper fabric layer (OG) and a middle fabric layer (MG) arranged therebetween, wherein
   a) the weft threads of the middle fabric layer (MG) emerge from said middle fabric layer (MG) in a first partial region (ETB) of the OPW airbag and are partially tied to the upper fabric layer (OG) and partially to the lower fabric layer and wherein
   b) the warp threads of the middle fabric layer (MG) emerge from said middle fabric layer (MG) in the first partial region (ETB) of the OPW airbag and float freely between the lower fabric layer and the upper fabric layer (OG) and wherein
   c2) the weft threads and the warp threads of the middle fabric layer (MG) are tied to the lower fabric layer or to the upper fabric layer (OG) at a few attachment points (AP).

2. The OPW airbag according to claim 1, with variant c2), wherein the weft threads and the warp threads of the middle fabric layer (MG) are incorporated in a second partial region (ZTB) of the OPW airbag except for at the attachment points (AP) in an inner lower fabric layer (IGLU) parallel to the lower fabric layer or in an inner upper fabric layer (IGLO) parallel to the upper fabric layer (OG).

3. The OPW airbag according to claim 1, wherein the upper fabric layer (OG) and the middle fabric layer (MG) are joined together in selected regions via X-tethers (X).

4. The OPW airbag according to claim 1, wherein the lower fabric layer and the middle fabric layer (MG) are joined together in selected regions via X-tethers (X).

5. The OPW airbag according to claim 1, wherein it comprises a front portion (VA), a middle portion (MA) and a rear portion (HA), a generator mouth (GEM) for receiving a generator (G) being arranged in the front portion (VA) and adjacent thereto an inflow region (ESB) being arranged in a first partial region (ETB),
   between the middle fabric layer (MG) and the lower fabric layer
      stiffening chambers (LVK), extending longitudinally in the direction of the rear portion (HA), being arranged in the middle portion (MA), and
      stiffening chambers (QVK), extending transversely thereto, being arranged in the rear portion (HA).

6. The OPW airbag according to claim 5, wherein X-tether series (XTK), adjacent and parallel to the stiffening chambers (QVK), which extend transversely between the middle fabric layer (MG) and the lower fabric layer, are arranged between the middle fabric layer (MG) and the upper fabric layer (OG), the width of said series being less than the width of the stiffening chambers (QVK) which extend transversely.

7. The OPW airbag according to claim 1, wherein it comprises at least one substantially linear single-layer region (EB), extending transversely, in the region between the middle portion (MA) and the rear portion (HA).

8. The OPW airbag according to claim 1, wherein it comprises lateral recesses (SEA) in the region between the middle portion (MA) and the rear portion (HA).

9. The OPW airbag according claim 1, wherein it is provided with a polymer layer on its outer surfaces.

* * * * *